3,381,152
FOUCAULT CURRENT BRAKING DEVICES
Pierre Etienne Bessiere, Golf de Saint-Nom-la-Breteche, France, assignor to Societe Labavia, Saint-Ouen, Seine-St.-Denis, France, a society of France
Filed Dec. 8, 1964, Ser. No. 416,724
Claims priority, application France, Dec. 10, 1963, 956,691
3 Claims. (Cl. 310—93)

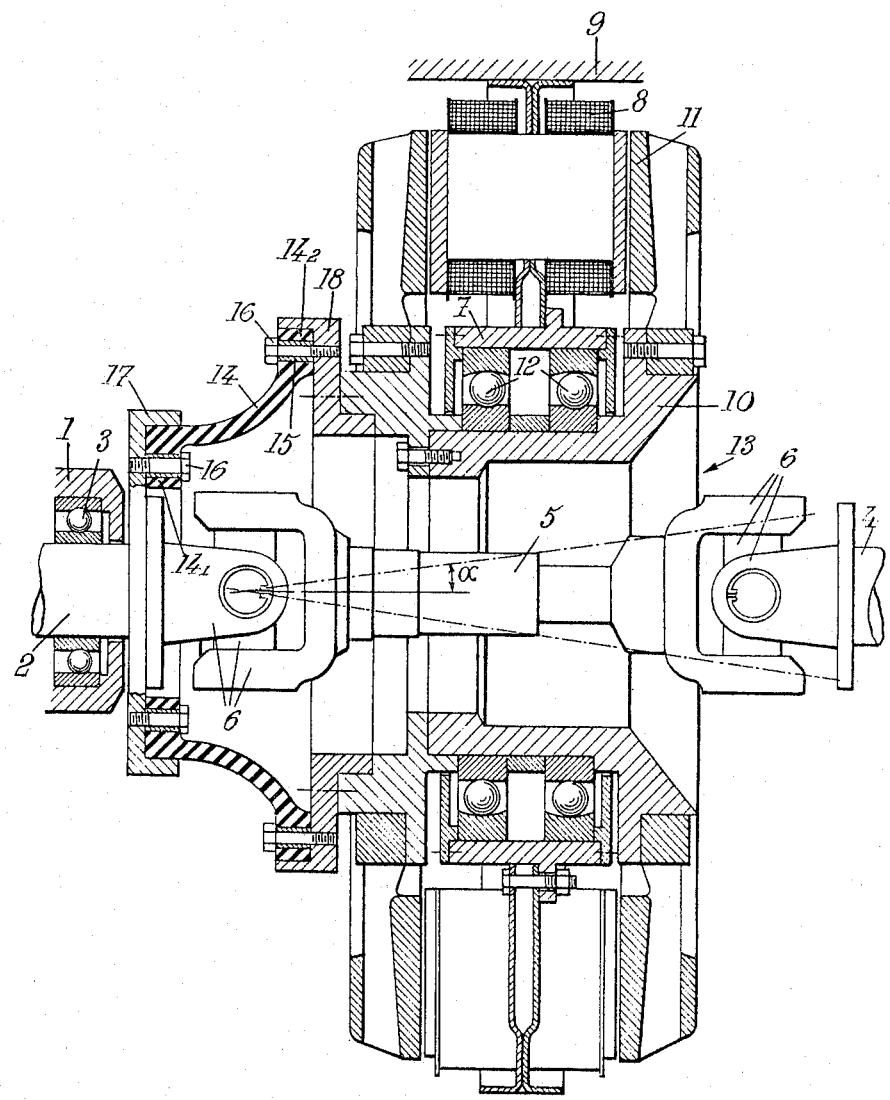

ABSTRACT OF THE DISCLOSURE

The Foucault current braking device exerts a braking torque upon the portion of a vehicle transmission shaft comprised between the gear box and the driving axle, especially when said portion is very short. Said device comprises a stator secured to the suspended part of the vehicle and a rotor rotatable in said stator; the whole of said two parts forms an annular structure surrounding the shaft portion so as to allow it to move angularly, and the rotor is flexibly coupled to the gear box output shaft.

---

The present invention relates to Foucault current slowing down devices mounted on vehicles so as to exert, at the desired time, a braking torque upon a portion of the vehicle transmission shaft comprised between the gear box and the driving axle. The invention is more especially, but not exclusively, concerned with devices of this kind mounted on vehicles where the driving axle is located at a very small distance from the gear box.

The chief object of the present invention is to provide a slowing down device of this kind which is well adapted to meet the requirements of practice.

The invention is to be used in slowing down devices including a stator carried by the suspended portion of the vehicle, a rotor rotatable about the axis of this stator and preferably mounted, for this purpose, between two bearings carried by the stator, and means for producing, at the desired time, in at least one of said parts, Foucault currents capable of braking the relative movements between the rotor and the stator.

The present invention consists in the fact that the whole of said parts (rotor and stator) is arranged in the general form of an annular structure so that the shaft portion transmitting the drive from the gear box to the driving axle of the vehicle can extend freely through the axial zone of said annular structure despite angular displacements of said shaft portion, the rotor being provided with means for coupling it in rotation with the output shaft of the gear box, said means flexible absorbing the relative displacements between the output shaft of the gear box, and the rotor.

A preferred embodiment of the present invention will be hereinafter described with reference to the appended drawings, given merely by way of example, and in which:

The only figure of this drawing is an axial sectional view of a slowing down device made according to the present invention.

It should be reminded that it is commonly known directly to mount a slowing down device on the portion of a vehicle driving means interposed between the gear box and the rear axle of said vehicle by inserting the rotor of this device in series between two universal joints which respectively connect the output shaft of the gear box with the rotor and the rotor with the rear axle of the vehicle.

Such a construction permits of directly mounting on the suspended frame of the vehicle the stator of the slowing down device (which stator supports the rotor through suitable bearings) while permitting on the one hand small relative displacements of the gear box with respect to the frame (said gear box being generally mounted on the frame, together with the engine, through special damping means) and on the other hand great relative displacement of the rear axle, which is not suspended, with respect to said frame.

But such a construction is possible only if a relatively great distance (for instance at least one meter) exists between the gear box and the rear axle. It is no longer possible for vehicles wherein the distance between the gear box and the driving axle has the minimum length compatible with the relative displacements between these two elements, account being taken of the necessity of ensuring a transmission such that the driven shaft has a constant angular velocity when the driving shaft is itself running with constant angular velocity. In some vehicles, the output shaft of the gear box is connected to the rear axle through a shaft portion provided with a universal joint at its end thereof, the length of which is as low as 50 cms. or even less. This is the case for instance of some tractors where the rear driving axle is very close to the front steering axle, or again of some motor coaches wherein the whole of the suspended driving elements is grouped to form a block of relatively small dimensions.

According to the present invention the difficulty resulting from the fact that the above mentioned distance is very short is obviated by arranging the slowing down device in the general form of a ring through which can pass freely the short shaft portion ensuring transmission between the output of the gear box and the rear axle, despite relatively important angular displacements of this shaft portion and the output shaft of the gear box is permanently coupled with the rotor of this slowing down device through a coupling system which also surrounds said shaft portion and is capable of flexibly absorbing the misalinements and relative displacements between said output shaft and said rotor.

The rotor of the slowing down device is thus mounted in shunt with respect to the transmission shaft, whereby the flexible coupling means which connect it with said shaft have not to transmit the torque for driving the vehicle, but merely the relatively small braking torque created by this slowing down device.

Another important advantage of this shunt mounting of the slowing down device lies in the fact that said device can be supported, as in the known systems above referred to, by the suspended frame of the vehicle either rigidly or through resilient suspension means. Thus the chain of transmission of the driving movement (and in particular the gear box and the rear axle included in said chain) is wholly free from the mass of the slowing down device, which is advantageous in view of the fact that said chain is not provided to support such a mass.

Still another advantage of the shunt mounting of the slowing down device lies in that said device can be very easily adapted to existing transmissions, since it suffices to mount said slowing down device in the form of a ring on the vehicle in a position such that a portion of the transmission extends freely therethrough, then of coupling in rotation with the gear box output shaft the input element of the flexible coupling system included in this device.

It may also be noted that, due to its shunt mounting, the slowing down device no longer risks undergoing the shocks that may occur in the axial direction in the transmission chain, as this was the case in known arrangements, since said shock are in the present case aborbed by the flexible coupling mean.

Of course the Foucault current slowing down device may be of any desired construction and as well of the homopolar type as of the hetero-polar type and its rotor may include either one disc or several discs or again a cylindrical ring, etc.

As for the flexible coupling means above referred to they may be made in any desirable manner from linking elements capable of transmitting the braking torque between the parts to be coupled together (output shaft of the gear box and rotor of the slowing down device) while permitting possible misalinements of said respective parts and flexibly absorbing their relative displacements in all possible direction, which displacements are unavoidable due to the independence between the suspensions, generally resilient, of these two parts.

The drawing given by way of illustration of the present invention, shows a vehicle gear box 1, the output shaft 2 of said gear box being carried by bearings 3. This shaft 2 is connected to the input shaft 4 of the vehicle rear axle through a shaft portion 5 and two universal joints 6 interposed between the ends of said shaft portion 5 and, respectively, output shaft 2 and rear axle shaft 4. Shaft portion 5 is relatively short, for instance about 50 cm., and may undergo angular displacements of $\pm \alpha$ about its mean position, this angle being for instance of the order of 10°.

The slowing down device proper comprises:

A stator 7 including a plurality of inductor coil 8 and suspended from the frame 9 of the vehicle and A rotor 10 including two discs 11 disposed on opposite sides of the coils of stator 7, said rotor being mounted in two bearings 12 carried by the stator.

The whole of the stator and the rotor forms a ring provided with an axial opening 13 of large diameter. The dimensions and shape of this opening 13 are determined in such manner that it permits free passage of shaft portion 5 and angular displacements of said shaft portion without risks of contact between said shaft portion and the inner wall of the opening.

A rotor 9 of the slowing down device is driven by shaft 2 through resilient coupling means consisting essentially of a diaphragm 14 of rubber or an elastomer material, possibly provided with reinforcements. The shape and dimensions of this diaphragm 14 are such that it can transmit the braking torque and flexibly absorb all deformations of this transmission other than torsional, for instance radial axial deformations. This form is for instance that of a frustum of a cone having curvilinear generatrices the axial half section of which is in the form of a circular arc having its concavity turned toward the outside. Said diaphragm is provided at its ends with two thickened ring shaped portions $14_1$ and $14_2$ through which pass metallic sockets 15 made adherent to rubber and cooperating with fixation screws themselves screwed in two plates 17 and 18 rigid respectively with shaft 2 and rotor 10.

The operation of this device is as follows:

When the vehicle is running, shafts 2, 4 and 5 are revolving and drive rotor 10 at the same speed through coupling means 14, 18. In order to slow down the vehicle, it suffices to send an electric current through coils 8, which electrically brakes disc 11 by induction, the braking torque thus created being applied flexibly at the same time to the transmission shaft of the vehicle through system 14–18.

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What I claim is:

1. For use on a vehicle including a suspended portion, a gear box having an output shaft, a driving axle, a shaft portion for transmitting motion from said output shaft to said driving axle, and universal joints for coupling said shaft portion, at one end, to said output shaft, and at the other end, to said driving axle, a slowing down device which comprises, in combination, two parts rotatable with respect to each other about an axis longitudinal with respect to the vehicle, said parts being, respectively, a stator secured to the vehicle suspended portion, and a rotor rotatable in said stator means for producing Foucault currents in at least one of said two parts rotating with respect to each other, the whole of said two parts forming an annular structure surrounding said shaft portion so as to leave it free to move angularly, and means for coupling said rotor to the gear box output shaft, said last mentioned means being capable of flexibly absorbing the relative displacements between said gear box output shaft and said rotor.

2. For use on a vehicle including a suspended portion, a gear box having an output shaft, a driving axle, a shaft portion for transmitting motion from said output shaft to said driving axle, and universal joints for coupling said shaft portion, at one end, to said output shaft, and at the other end, to said driving axle, a slowing down device which comprises, in combination, two parts rotatable with respect to each other about an axis longitudinal with respect to the vehicle, said parts being, respectively, a stator secured to the vehicle suspended portion, and a rotor rotatable in said stator means for producing Foucault currents in at least one of said two parts rotating with respect to each other, the whole of said two parts forming an annular structure surrounding said shaft portion so as to leave it free to move angularly, and an elastomer diaphragm for coupling said rotor to the gear box output shaft.

3. For use on a vehicle including a suspended portion, a gear box having an output shaft, a driving axle, a shaft portion for transmitting motion from said output shaft to said driving axle, and universal joints for coupling said shaft portion, at one end, to said output shaft, and at the other end, to said driving axle, a slowing down device which comprises, in combination, two parts rotatable with respect to each other about an axis longitudinal with respect to the vehicle, said parts being, respectively, a stator secured to the vehicle suspended portion a rotor rotatable in said stator, means for producing Foucault currents in at least one of said two parts rotating with respect to each other, the whole of said two parts forming an annular structure surrounding said shaft portion so as to leave it free to move angularly, and an elastomer diaphragm for coupling said rotor to the gear box output shaft, said diaphragm having the general shape of a frustum of a cone having one base fixed on said gear box output shaft and the other base fixed to said rotor, the axial section of said diaphragm consisting of two opposed circular arcs having their respective concavities turned toward the outside.

References Cited

UNITED STATES PATENTS

| | | | |
|---|---|---|---|
| 2,516,903 | 8/1950 | Oetzel | 310—93 |
| 2,538,796 | 1/1951 | Oetzel et al. | 310—93 |
| 2,565,038 | 8/1951 | McCurtain | 310—93 |

ROBERT K. SCHAEFER, *Primary Examiner.*

H. O. JONES, *Assistant Examiner.*